(12) United States Patent
Komoto

(10) Patent No.: US 10,774,167 B2
(45) Date of Patent: Sep. 15, 2020

(54) MODIFIED POLYOLEFIN RESIN

(71) Applicant: NIPPON PAPER INDUSTRIES CO., LTD., Kita-ku (JP)

(72) Inventor: Naosuke Komoto, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 41 days.

(21) Appl. No.: 16/064,163

(22) PCT Filed: Dec. 14, 2016

(86) PCT No.: PCT/JP2016/087289
§ 371 (c)(1),
(2) Date: Jun. 20, 2018

(87) PCT Pub. No.: WO2017/110633
PCT Pub. Date: Jun. 29, 2017

(65) Prior Publication Data
US 2018/0371142 A1    Dec. 27, 2018

(30) Foreign Application Priority Data

Dec. 22, 2015 (JP) ................................ 2015-250503

(51) Int. Cl.
*C08F 255/02* (2006.01)
*C08L 23/28* (2006.01)
*C08F 8/50* (2006.01)
*C09D 5/00* (2006.01)
*C08J 3/05* (2006.01)
*C09D 151/06* (2006.01)
*C08F 8/22* (2006.01)
*C08J 7/04* (2020.01)
*C08L 23/14* (2006.01)
*C08L 51/06* (2006.01)
*C08F 285/00* (2006.01)
*C08F 210/06* (2006.01)
*C08L 23/26* (2006.01)

(52) U.S. Cl.
CPC ............ *C08F 255/023* (2013.01); *C08F 8/22* (2013.01); *C08F 8/50* (2013.01); *C08F 285/00* (2013.01); *C08J 3/05* (2013.01); *C08J 7/042* (2013.01); *C08L 23/14* (2013.01); *C08L 23/28* (2013.01); *C08L 51/06* (2013.01); *C09D 5/002* (2013.01); *C09D 151/06* (2013.01); *C08F 210/06* (2013.01); *C08F 2800/20* (2013.01); *C08J 2323/12* (2013.01); *C08J 2351/06* (2013.01); *C08J 2451/06* (2013.01); *C08J 2475/04* (2013.01); *C08L 2023/42* (2013.01); *C08L 2201/54* (2013.01)

(58) Field of Classification Search
CPC .. C08F 255/00; C08F 255/02; C08F 255/023; C08F 285/00; C08F 8/22; C08F 8/50; C08F 210/06; C08F 2800/20; C08L 23/14; C08L 23/28; C08L 51/06; C08L 2201/54; C08L 2023/42; C08J 7/042; C08J 3/05; C08J 2451/06; C08J 2475/04; C08J 2323/12; C08J 2351/06; C09D 151/06; C09D 5/002
See application file for complete search history.

(56) References Cited

U.S. PATENT DOCUMENTS

| | | | | |
|---|---|---|---|---|
| 5,492,963 | A | * | 2/1996 | Ozawa .................. C09J 123/28 524/576 |
| 2006/0025535 | A1 | * | 2/2006 | Onoe .................... C08F 255/00 525/244 |
| 2006/0148995 | A1 | | 7/2006 | Nakajima et al. |
| 2007/0191547 | A1 | | 8/2007 | Sekiguchi |
| 2009/0137721 | A1 | | 5/2009 | Fujino |
| 2010/0029836 | A1 | | 2/2010 | Hirose et al. |
| 2011/0274941 | A1 | | 11/2011 | Yada et al. |
| 2015/0073081 | A1 | | 3/2015 | Aso et al. |

FOREIGN PATENT DOCUMENTS

| CN | 1751076 | 3/2006 |
|---|---|---|
| CN | 1772781 | 5/2006 |
| CN | 1930198 | 3/2007 |
| CN | 101589101 | 11/2009 |
| CN | 104220492 | 12/2014 |
| EP | 1 469 035 A1 | 10/2004 |

(Continued)

OTHER PUBLICATIONS

Chan, K. et al. European Polymer Journal vol. 28 pp. 1021-1025 (Sep. 1992).*
Love, C.T. Journal of Power Sources vol. 196 pp. 2905-2912 (Nov. 2010).*
International Search Report dated Mar. 21, 2017 in PCT/JP2016/087289 filed Dec. 14, 2016.
Combined Taiwanese Office Action and Search Report dated Jun. 20, 2017 in Patent Application No. 105142428 (with English language translation).

(Continued)

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

The present invention provides a modified polyolefin resin that can form a coating that exhibits excellent adhesion to a low-polarity base material, especially a poorly adherable polyolefin base material with no surface treatment even when being dried at low temperatures and has flexibility (bendability). Provided is a modified polyolefin resin that is a modified product of a polyolefin resin having a melting point (Tm) by a differential scanning calorimeter (DSC) of 60 to 165° C. with a modifier comprising the following (A):
(A) a monomer mixture comprising Monomer Group (A-1) and Monomer Group (A-2) with a weight ratio of Monomer Group (A-1) to Monomer Group (A-2) ((A-1)/(A-2)) of 30/70 to 50/50.

13 Claims, No Drawings

(56) References Cited

FOREIGN PATENT DOCUMENTS

| | | |
|---|---|---|
| EP | 1 640 390 A1 | 3/2006 |
| JP | 63-10606 A | 1/1988 |
| JP | 4-356530 A | 12/1992 |
| JP | 5-179193 A | 7/1993 |
| JP | 9-99629 A | 4/1997 |
| JP | 2623418 B2 | 6/1997 |
| JP | 2001-302907 A | 10/2001 |
| JP | 2004-161952 A | 6/2004 |
| JP | 2004-269872 A | 9/2004 |
| JP | 2004-277617 A | 10/2004 |
| JP | 2006-205482 A | 8/2006 |
| JP | 2006-272655 A | 10/2006 |
| JP | 2006-281443 A | 10/2006 |
| JP | 2006-346896 A | 12/2006 |
| JP | 2007-204681 A | 8/2007 |
| JP | 2012-207167 A | 10/2012 |
| WO | WO 2010/084913 A1 | 7/2010 |

OTHER PUBLICATIONS

Combined Taiwanese Office Action and Search Report dated Dec. 26, 2017 in Patent Application No. 105142428 (with English language translation).

Extended European Search Report dated Aug. 7, 2019, in Patent Application No. 16878524.4, citing documents AO-AP therein, 8 pages.

Office Action dated Nov. 19, 2019 in corresponding Korean Patent Application No. 10-2018-7017469 (with English Translation), citing document AO therein, 8 pages.

Office Action in corresponding Chinese patent application No. 201680075137.0 dated Mar. 12, 2020 (w/English Translation).

\* cited by examiner

MODIFIED POLYOLEFIN RESIN

CROSS-REFERENCE TO RELATED APPLICATIONS

This application is a National Stage of PCT/JP2016/087289, which was filed on Dec. 14, 2016. This application is based on and claims the benefit of priority to Japanese Application No. 2015-250503, which was filed on Dec. 22, 2015.

TECHNICAL FIELD

The present invention relates to a modified polyolefin resin.

BACKGROUND ART

Polyolefin-based resins such as polypropylene and polyethylene are thermoplastic general-purpose resins, low in price, and have many excellent properties such as moldability, chemical resistance, weatherability, water resistance, and electric characteristics. Given these circumstances, they have been conventionally used in wide fields as sheets, films, molded articles, and the like. However, base materials made of these polyolefin-based resins (hereinafter, also referred to as a "polyolefin-based base material") are low in polarity and crystalline and are thus poorly adherable base materials and have a drawback in that the adhesion and application of polyolefin-based resins and the adhesion and application of high-polarity substances are difficult unlike polar base materials such as polyurethane-based resins, polyamide resins, acrylic-based resins, polyester resins, and metals.

As to a method for improving the adhesion of the polyolefin-based base material, surface treatment has been conventionally performed on the base material. Examples of the surface treatment include roughening by polishing and introduction of polar groups by oxidants, corona discharge, plasma treatment, and flaming treatment; these means have drawbacks in that they are low in the reproducibility of an adhesion improvement effect and the effect reduces with the passage of time and are not widespread among the general public.

Given these circumstances, a method is devised that applies a pretreatment agent having adhesion to a base material to the surface of the base material in advance. Such a pretreatment agent is called variously depending on its use; it is called an adhesive, a binder, or a primer, for example. Resins having certain properties are used for the pretreatment agent, for example; provided are hot-melt pretreatment agents that involves melting by heat to make a binder or the like, solvent-based ones in which a resin is dissolved in a solvent, aqueous ones in which a resin is emulsified with a surfactant or the like, and the like.

A binder resin solution composition is disclosed that contains a modified polyolefin resin modified with derivatives of an unsaturated polycarboxylic acid and methacrylic acid and a mixed solvent of an alicyclic hydrocarbon and an aromatic hydrocarbon, for example (Patent Literature 1).

A resin composition for plastic paint is disclosed that contains an acrylic copolymer obtained by copolymerizing a certain monomer such as a methacrylic acid alkyl ester in the presence of a chlorinated polyolefin-based resin and an epoxy resin (Patent Literature 2). A binder resin composition is disclosed that is obtained by graft polymerizing (meth)acrylic acid or the like to a chlorinated polyolefin-based resin (Patent Literature 3).

A binder resin is disclosed that is obtained by graft copolymerizing 2-hydroxyethyl acrylate to a resin obtained by reacting a chlorinated polyolefin-based resin, an organic diisocyanate, and a polymer polyol (Patent Literature 4). An adhesive composition is disclosed that contains a resin obtained by reacting a polyurethane component obtained by reacting a certain polyester polyol and an organic isocyanate compound with a (meth)acrylate monomer or the like in the presence of a chlorinated polyolefin-based component (Patent Literature 5).

PRIOR ART REFERENCES

Patent Literature

Patent Literature 1: Japanese Patent Application Laid-open No. 2004-277617
Patent Literature 2: Japanese Patent Application Laid-open No. H05-179193
Patent Literature 3: Japanese Patent Application Laid-open No. 2004-161952
Patent Literature 4: Japanese Patent No. 2623418
Patent Literature 5: Japanese Patent Application Laid-open No. 2001-302907

SUMMARY OF INVENTION

Problem to be Solved by the Invention

The pretreatment agent preferably has favorable adhesion to a base material even when being dried or baked at low temperatures.

The binder resin composition described in Patent Literature 1 is improved in storage stability at low temperatures, and yet its adhesion is preferably further improved.

A chlorinated polyolefin is poor in resistance to ultraviolet rays, heat, and oil and thus does not have sufficient coating performance, which is preferably improved. To improve the performance, it is considered that an acrylic resin or alkyd resin having favorable coating characteristics is mixed with the chlorinated polyolefin to be used as a pretreatment agent. However, the acrylic resin or alkyd resin itself is poor in compatibility with the chlorinated polyolefin, and such a mixture made into a coating causes a problem in that the luster and oil resistance of the coating significantly degrade and coating appearance is impaired. A reduced amount of the chlorinated polyolefin used with an intention to improve the coating appearance of such a mixture has a drawback in that a problem with adhesion occurs. The chlorinated polyolefin resins obtained by copolymerizing (meth)acrylic acid and the like of Japanese Patent Application Laid-open No. H05-179193 (Patent Literature 2) and Japanese Patent Application Laid-open No. 2004-161952 (Patent Literature 3) are not sufficient in flexibility (bendability) when being made into a coating, although they have improved adhesion.

The resins of Japanese Patent No. 2623418 (Patent Literature 4) and Japanese Patent Application Laid-open No. 2001-302907 (Patent Literature 5) have difficulty in obtaining a uniform solution and have difficulty in obtaining a resin having both favorable adhesion to a polyolefin resin base material and flexibility (bendability).

As described above, it is difficult to obtain a resin having all pieces of performance of adhesion to the polyolefin-based base material and the flexibility (bendability) of the coating in a well-balanced manner.

An object of the present invention is to provide a modified polyolefin resin that can form a coating that exhibits excellent adhesion to, not only a polar base material, a low-polarity base material, especially a poorly adherable polyolefin base material with no surface treatment even when being dried at low temperatures and has flexibility (bendability). Another object thereof is to provide a modified polyolefin resin that, when being used as a pretreatment agent, has excellent adhesion to an overcoated layer and can be used as an excellent pretreatment agent for the base material.

Means for Solving Problem

In view of the above problems, the inventors of the present invention have found out through earnest study that a modified polyolefin resin that is a modified product of a polyolefin resin having a melting point (Tm) measured by a differential scanning calorimeter (DSC) of 60 to 165° C. with a modifier comprising a certain monomer mixture forms a coating having flexibility to sheets and molded articles of polypropylene with no surface treatment and exhibits favorable adhesion (adhesiveness) even when drying treatment at low temperatures is performed to reach the present invention.

The present invention provides the following [1] to [13].

[1] A modified polyolefin resin that is a modified product of a polyolefin resin having a melting point (Tm) measured by a differential scanning calorimeter (DSC) of 60 to 165° C. with a modifier comprising the following (A):

(A) a monomer mixture comprising the following Monomer Group (A-1) and Monomer Group (A-2) with a weight ratio of Monomer Group (A-1) to Monomer Group (A-2) ((A-1)/(A-2)) of 30/70 to 50/50, Monomer Group (A-1): one or more monomers comprising an ethylenically unsaturated bond and a functional group wherein a homopolymer of the one or more monomers has a glass transition temperature (Tg) of 60° C. or more, Monomer Group (A-2): one or more monomers comprising an ethylenically unsaturated bond and a functional group wherein a homopolymer of the one or more monomers has a glass transition temperature (Tg) of 30° C. or less.

[2] The modified polyolefin resin according to [1], wherein the functional group is one or more selected from a carboxy group, a group represented by —(C=O)—O—, a hydroxy group, an ether group, and an optionally substituted amino group.

[3] The modified polyolefin resin according to [1] or [2], wherein at least one of the one or more monomers included in Monomer Group (A-1) comprises a carboxy group as the functional group.

[4] The modified polyolefin resin according to any one of [1] to [3], wherein Monomer Group (A-1) includes one or more selected from (meth)acrylic acid and alkyl (meth)acrylates.

[5] The modified polyolefin resin according to any one of [1] to [4], wherein at least one of the one or more monomers included in Monomer Group (A-2) comprises one or more selected from a hydroxy group and an ether group as the functional group.

[6] The modified polyolefin resin according to any one of [1] to [5], wherein Monomer Group (A-2) includes one or more selected from alkyl (meth)acrylates, hydroxyalkyl (meth)acylates, and alkoxy alkyl (meth)acrylates.

[7] The modified polyolefin resin according to any one of [1] to [6], wherein the modifier further comprises one or more selected from the following (B) and the following (C):

(B) chlorine, (C) one or more selected from α,β-unsaturated carboxylic acids and derivatives thereof.

[8] A resin composition comprising the modified polyolefin resin according to any one of [1] to [7].

[9] An organic solvent-containing resin composition comprising:

the modified polyolefin resin according to any one of [1] to [7]; and an organic solvent.

[10] An aqueous resin composition comprising:

the modified polyolefin resin according to any one of [1] to [7]; and water.

[11] A method for manufacturing a modified polyolefin resin, the method comprising modifying a polyolefin resin having a melting point (Tm) measured by a differential scanning calorimeter (DSC) of 60 to 165° C. with a modifier comprising the following (A):

(A) a monomer mixture comprising the following Monomer Group (A-1) and Monomer Group (A-2) with a weight ratio of Monomer Group (A-1) to Monomer Group (A-2) ((A-1)/(A-2)) of 30/70 to 50/50, Monomer Group (A-1): one or more monomers comprising an ethylenically unsaturated bond and a functional group wherein a homopolymer of the one or more monomers has a glass transition temperature (Tg) of 60° C. or more, Monomer Group (A-2): one or more monomers comprising an ethylenically unsaturated bond and a functional group wherein a homopolymer of the one or more monomers has a glass transition temperature (Tg) of 30° C. or less.

[12] The method for manufacturing a modified polyolefin resin according to [11], wherein the modifier further comprises one or more selected from the following (B) and the following (C):

(B) chlorine, (C) one or more selected from α,β-unsaturated carboxylic acids and derivatives thereof.

[13] The method for manufacturing a modified polyolefin resin according to [12], comprising modifying with one or more selected from (B) and (C) and then modifying with (A).

Effect of the Invention

The modified polyolefin resin of the present invention can form a coating having flexibility (bendability) to, not only a polar base material, even a low-polarity base material (a nonpolar base material), especially a poorly adherable polyolefin-based base material with no surface treatment and can obtain excellent adhesion even when being dried at low temperatures. Further, the modified polyolefin resin of the present invention has excellent adhesion to an overcoated layer and can be used as an excellent pretreatment agent to the base material.

EMBODIMENTS FOR CARRYING OUT THE INVENTION

The following describes the present invention in detail.

The present invention is a modified polyolefin resin that is a modified product of a polyolefin resin having a melting point (Tm) measured by a differential scanning calorimeter (DSC) of 60 to 165° C. with a modifier comprising the following (A):

(A) a monomer mixture comprising the following Monomer Group (A-1) and Monomer Group (A-2) with a weight ratio of Monomer Group (A-1) to Monomer Group (A-2) ((A-1)/(A-2)) of 30/70 to 50/50, Monomer Group (A-1): one or more monomers comprising an ethylenically unsaturated bond and a functional group wherein a homopolymer of the one or more monomers has a glass transition temperature (Tg) of 60° C. or more, Monomer Group (A-2): one or more monomers comprising an ethylenically unsaturated bond and a functional group wherein a homopolymer of the one or more monomers has a glass transition temperature (Tg) of 30° C. or less.

[Raw Material Polyolefin Resin]

A polyolefin resin as a raw material of the modified polyolefin resin of the present invention, which is not limited to a particular polyolefin resin so long as it is a polymer of olefins, is preferably a polyolefin resin manufactured using a Ziegler Natta catalyst or a metallocene catalyst as a polymerization catalyst and more preferably polypropylene or a polyolefin resin obtained by copolymerizing propylene and an α-olefin (e.g., ethylene, butene, 3-methyl-1-butene, and 3-methyl-1-heptene) manufactured using a Ziegler Natta catalyst or a metallocene catalyst as a polymerization catalyst. Polypropylene and the polyolefin resin obtained by randomly copolymerizing propylene and the α-olefin may be referred to as a propylene-based random copolymer. Examples of the propylene-based random copolymer include polypropylene, an ethylene-propylene copolymer, a propylene-butene copolymer, and an ethylene-propylene-butene copolymer. The polyolefin resin is further preferably the propylene-based random copolymer manufactured using a metallocene catalyst as a polymerization catalyst and particularly preferably polypropylene, an ethylene-propylene copolymer, a propylene-butene copolymer, or an ethylene-propylene-butene copolymer manufactured using a metallocene catalyst as a polymerization catalyst. These resins may be used singly, or a plurality of resins may be used in a mixed manner.

As to the metallocene catalyst, known ones may be used. Specific examples of the metallocene catalyst include a catalyst obtained by combining the following Components (1) and (2) and further (3) as needed; preferred is a catalyst obtained by combining the following Components (1) and (2) and further (3) as needed. Component (1): a metallocene catalyst that is a compound of a IV to VI group transition metal of the periodic table having at least one conjugated five-membered ligand; Component (2): an ion exchange laminar silicate; and Component (3): an organic aluminum compound The polyolefin resin synthesized using the metallocene catalyst has features such as narrow molecular weight distribution, excellence in random copolymerizability and narrow composition distribution, and a wide range of copolymerizable comonomers and is thus preferred as the polyolefin resin of the present invention.

The structure of the polyolefin resin as the raw material of the modified polyolefin resin of the present invention is not limited to a particular structure and may be any of an isotactic structure, an atactic structure, a syndiotactic structure, and the like that normal polymer compounds can have; in view of adhesion to a polyolefin base material, especially adhesion in low-temperature dryness, a polyolefin resin with an isotactic structure polymerized using the metallocene catalyst is preferred.

The composition of the polyolefin resin as the raw material of the modified polyolefin resin of the present invention is not limited to a particular composition; preferably used as the raw material is a polyolefin resin with a propylene component of preferably 60% by mol or more, more preferably 70% by mol or more, and further preferably 80% by mol or more. Using the polyolefin resin with a propylene component of 60% by mol or more as the raw material makes the adhesion (adhesiveness) of the modified polyolefin resin to a propylene base material more favorable.

The polyolefin resin as the raw material of the modified polyolefin resin of the present invention has a melting point (Tm) measured by a differential scanning calorimeter (DSC) of 60 to 165° C., preferably 60° C. to 110° C., and more preferably 60° C. to 100° C. The measurement of Tm by the DSC in the present invention is a melting peak temperature when a sample of about 10 mg is melted at 200° C. for 5 minutes, is crystallized by lowering the temperature to −60° C. at a rate of 10° C./min, and is further melted by raising the temperature to 200° C. at 10° C./min using a DSC measuring apparatus (manufactured by Seiko Instruments Inc.). The polyolefin resin may be degraded in the presence of heat and/or radicals and then be modified with Component (A) described below.

The molecular weight of the polyolefin resin as the raw material of the modified polyolefin resin of the present invention, which is not limited to a particular molecular weight, is preferably adjusted such that the weight average molecular weight of a modified polyolefin resin modified with a modification component described below is within a range of 10,000 to 250,000. Consequently, the weight average molecular weight of the polyolefin resin is also preferably 10,000 to 250,000. When the weight average molecular weight of the polyolefin resin is larger than 250,000, it can be degraded in the presence of heat or radicals to adjust the molecular weight to an appropriate range. The weight average molecular weight and molecular weight distribution (Mw/Mn) in the present invention are values measured by gel permeation chromatography (standard substance: polystyrene).

[Modification Component]

The modified polyolefin resin of the present invention is a modified product of the polyolefin resin with the modifier comprising the following Component (A):

(A) a monomer mixture comprising the following Monomer Group (A-1) and Monomer Group (A-2) with a weight ratio of Monomer Group (A-1) to Monomer Group (A-2) ((A-1)/(A-2)) of 30/70 to 50/50, Monomer Group (A-1): one or more monomers comprising an ethylenically unsaturated bond and a functional group wherein each homopolymer of the one or more monomers has a glass transition temperature (Tg) of 60° C. or more, Monomer Group (A-2): one or more monomers comprising an ethylenically unsaturated bond and a functional group wherein each homopolymer of the one or more monomers has a glass transition temperature (Tg) of 30° C. or less.

When the polyolefin resin is modified with Component (A), the structure of the modified polyolefin resin changes by the reaction condition of modification and is difficult to identify.

The Tg of the homopolymer refers to a glass transition temperature (Tg) when a monomer is made into the homopolymer. Table 1 lists monomer examples included in Monomer Group (A-1) and Monomer Group (A-2) together with the Tgs of homopolymers.

In the present invention, the polyolefin resin is modified with a modifier obtained by combining Monomer Group (A-1) including a monomer whose homopolymer has a Tg of 60° C. or more and Monomer Group (A-2) including a monomer whose homopolymer has a Tg of 30° C. or less. Monomer Group (A-1) and Monomer Group (A-2) may each include only one monomer or two or more monomers. Monomer Group (A-1) and Monomer Group (A-2) preferably include two or more monomers. Unless otherwise specified, the homopolymer of the monomer included in Monomer Group (A-1) exemplified or shown as preferred one has a Tg of 60° C. or more, and the homopolymer of the monomer included in Monomer Group (A-2) exemplified or shown as preferred one has a Tg of 30° C. or less.

In the modified polyolefin resin of the present invention, the polyolefin resin is modified with the modifier obtained by combining Monomer Group (A-1) with a high Tg and Monomer Group (A-2) with a low Tg with a certain weight ratio (these Monomer Group (A-1) and Monomer Group (A-2) are preferably graft polymerized to the polyolefin resin), and the modified polyolefin resin can have both favorable adhesion to the base material and flexibility when being made into a coating.

In the present specification, comprising an ethylenically unsaturated bond means comprising a carbon-carbon double bond; a functional group (e.g., a $C_{1-5}$ alkyl group) may bond to the carbon-carbon double bond.

Examples of the functional group comprised in the monomer included in Monomer Group (A-1) or Monomer Group (A-2) include, but are not limited to, a carboxy group, a group represented by —(C=O)—O— (also referred to as an ester group in the present specification), a hydroxy group, an ether group, and an optionally substituted amino group. In the present specification, the hydroxy group as the functional group does not include the hydroxy group contained in the carboxy group.

Each of the monomers included in Monomer Group (A-1) or Monomer Group (A-2) may have only one functional group or two or more ones.

Each of the monomers included in Monomer Group (A-1) or Monomer Group (A-2) preferably comprises a carboxy group or an ester group as the functional group, more preferably comprises a carboxy group or an ester group as the functional group in which the carboxy group or the ester group bonds to the ethylenically unsaturated bond, is further preferably acrylic acid or an acrylic acid ester optionally substituted with a $C_{1-5}$ alkyl group (e.g., acrylic acid or an acrylic acid ester, methacrylic acid or an methacrylic acid ester, crotonic acid or an crotonic acid ester, and isocrotonic acid or an isocrotonic acid ester), and is particularly preferably (meth)acrylic acid or a (meth)acrylic acid ester.

Monomer Group (A-1) preferably includes one or more selected from monomers comprising a carboxy group as the functional group and comprising an ethylenically unsaturated bond (e.g., acrylic acid and methacrylic acid) and monomers comprising an ester group as the functional group and comprising an ethylenically unsaturated bond (e.g., isobornyl acrylate, methyl methacrylate, ethyl methacrylate, isopropyl methacrylate, t-butyl methacrylate, cyclohexyl methacrylate, and isobornyl methacrylate; 2-hydroxypropyl methacrylate; and tetrahydrofurfuryl methacrylate). Monomer Group (A-1) more preferably includes one or more selected from acrylic acid, methacrylic acid, isobornyl acrylate, methyl methacrylate, ethyl methacrylate, isopropyl methacrylate, t-butyl methacrylate, cyclohexyl methacrylate, and isobornyl methacrylate and further preferably includes two or more selected from these monomers.

Monomer Group (A-1) particularly preferably includes a monomer comprising a carboxy group as the functional group and comprising an ethylenically unsaturated bond.

Monomer Group (A-2) preferably includes one or more selected from monomers comprising an ester group as the functional group and comprising an ethylenically unsaturated bond (e.g., methyl acrylate, ethyl acrylate, propyl acylate, isopropyl acrylate, n-butyl acrylate, isobutyl acrylate, hexyl acrylate, octyl acrylate, isooctyl acrylate, lauryl acrylate, stearyl acrylate, cyclohexyl acrylate, benzyl acrylate, n-butyl methacrylate, 2-ethylhexyl methacrylate, hexyl methacrylate, octyl methacrylate, lauryl methacrylate, stearyl methacrylate, and tridecyl methacrylate), monomers comprising an ester group and a hydroxy group as the functional group and comprising an ethylenically unsaturated bond (e.g., 2-hydroxyethyl acrylate, 2-hydroxypropyl acrylate, and 4-hydroxybutyl acrylate), monomers comprising an ester group and an ether group as the functional group and comprising an ethylenically unsaturated bond (e.g., 2-methoxyethyl acrylate, 3-methoxybutyl acrylate, tetrahydrofurfuryl acrylate, ethylcarbitol acrylate, phenoxyethyl acrylate, 2-methoxyethyl methacrylate, and 2-ethoxyethyl methacrylate), and monomers comprising an ester group and an optionally substituted amino group as the functional group and comprising an ethylenically unsaturated bond (e.g., dimethylaminoethyl methacrylate and diethylaminoethyl methacrylate). Monomer Group (A-2) more preferably includes one or more selected from 2-hydroxyethyl acrylate, 2-hydroxypropyl acrylate, 4-hydroxybutyl acrylate, 2-methoxyethyl acrylate, 2-methoxyethyl methacrylate, 3-methoxybutyl acrylate, tetrahydrofurfuryl acrylate, butyl methacrylate, lauryl methacrylate, and n-butyl acrylate and further preferably includes two or more selected from these monomers.

Monomer Group (A-2) particularly preferably includes a monomer comprising one or more selected from a hydroxy group and an ether group as the functional group and comprising an ethylenically unsaturated bond or includes a monomer comprising a hydroxy group or an ether group as the functional group and comprising an ethylenically unsaturated bond.

In a preferred mode, Monomer Group (A-1) includes two or more monomers, and Monomer Group (A-2) includes two or more monomers. With this composition, the adhesion and flexibility of the modified polyolefin resin of the present invention are made more favorable.

Examples of the monomers that can be included in Monomer Group (A-1) or Monomer Group (A-2) include monomers listed in Table 1.

TABLE 1

Glass transition temperatures (Tg) of homopolymers of various kinds of monomers

| Functional group | Monomer | Homopolymer Tg (° C.) | Monomer | Homopolymer Tg (° C.) |
|---|---|---|---|---|
| Carboxy group | Acrylic acid | 103 | Methacrylic acid | 228 |
| Ester group | Methyl acrylate | 10 | Methyl methacrylate | 105 |
| | Ethyl acrylate | −24 | Ethyl methacrylate | 65 |
| | Propyl acrylate | −37 | | |
| | Isopropyl acrylate | −6 | Isopropyl methacrylate | 81 |
| | n-Butyl acrylate | −54 | n-Butyl methacrylate | 20 |
| | Isobutyl acrylate | −26 | | |
| | | | t-Butyl methacrylate | 107 |
| | | | 2-Ethylhexyl methacrylate | −10 |
| | Hexyl acrylate | −57 | Hexyl methacrylate | −5 |
| | Octyl acrylate | −65 | Octyl methacrylate | −25 |
| | Isooctyl acrylate | −58 | | |
| | Lauryl acrylate | 15 | Lauryl methacrylate | −65 |
| | Stearyl acrylate | 30 | Stearyl methacrylate | −100 |
| | Cyclohexyl acrylate | 15 | Tridecyl methacrylate | −46 |
| | Benzyl acrylate | 6 | Cyclohexyl methacrylate | 83 |
| | Isobornyl acrylate | 97 | Isobornyl methacrylate | 155 |
| Ester group and hydroxy group | 2-Hydroxyethyl acrylate | −15 | | |
| | 2-Hydroxypropyl acrylate | −7 | 2-Hydroxypropyl methacrylate | 76 |
| | 4-Hydroxybutyl acrylate | −32 | | |
| Ether group | 2-Methoxyethyl acrylate | −50 | 2-Methoxyethyl methacrylate | −2 |
| | | | 2-Ethoxyethyl methacrylate | −31 |
| | 3-Methoxybutyl acrylate | −56 | | |
| | Tetrahydrofurfuryl acrylate | −12 | Tetrahydrofurfuryl methacrylate | 60 |
| | Ethyl carbitol acrylate | −67 | | |
| | Phenoxyethyl acrylate | −22 | | |
| Optionally substituted amino group | | | Dimethylaminoethyl methacrylate | 18 |
| | | | Diethylaminoethyl methacrylate | 16-24 |

The weight ratio of Monomer Group (A-1) to Monomer Group (A-2) ((A-1)/(A-2)) is 30/70 to 50/50. The Tg of a polymer obtained from all the monomers included in Monomer Group (A-1) and Monomer Group (A-2) (hereinafter, also referred to as Monomer Group ((A-1)+(A-2))) (a total Tg) is preferably 30° C. or less. The total Tg is a value calculated by the following FOX formula.

In FOX formula, the total Tg is calculated by calculating the glass transition temperature (Tg) of a homopolymer of each of the monomers included in Monomer Group ((A-1)+(A-2)) and the weight fraction (W) thereof in Monomer Group ((A-1)+(A-2)) and summing the ratio of Tg to W of each homopolymer. As to the Tg of each homopolymer, Tg described in Polymer Handbook (Wiley-Interscience Publication, 4th Edition, 1999) and production data may be used.

$$1/Tg + W_1/Tg_1 + W_2/Tg_2 + W_3/Tg_3 + \ldots W_n/Tg_n.$$ <FOX formula>

The above formula is a formula for a case in which Monomer Group ((A-1)+(A-2)) includes n monomers. $Tg_1$ is the glass transition temperature of a homopolymer of Monomer 1 included in Monomer Group ((A-1)+(A-2)), and $W_1$ is the weight fraction of the homopolymer of Monomer 1. $Tg_2$ is the glass transition temperature of a homopolymer of Monomer 2 included in Monomer Group ((A-1)+(A-2)), and $W_2$ is the weight fraction of the homopolymer of Monomer 2. $Tg_3$ is the glass transition temperature of a homopolymer of Monomer 3 included in Monomer Group ((A-1)+(A-2)), and $W_3$ is the weight fraction of the homopolymer of Monomer 3. $Tg_n$ is the glass transition temperature of a homopolymer of Monomer n included in Monomer Group ((A-1) (A-2)), and $W_n$ is the weight fraction of the homopolymer of Monomer n.

When the weight ratio of Monomer Group (A-1) to Monomer Group (A-2) is out of the range, adhesion to a low-polarity adherend (e.g., a polyolefin base material) and flexibility degrade, which is thus not preferred.

A graft weight in the modified polyolefin resin of Monomer Group ((A-1)+(A-2)) in total is preferably 0.1% by weight or more, more preferably 1.0% by weight or more, further preferably 3.0% by weight or more, preferably 98% by weight or less, more preferably 90% by weight or less, and further preferably 85% by weight or less. When the graft weight is less than 0.1% by weight, the solubility, the compatibility with other resins, and the adhesion (adhesiveness) of the modified polyolefin resin tend to degrade. When the graft weight is larger than 98% by weight, adhesion (adhesiveness) to a low-polarity adherent tends to degrade.

The modified polyolefin resin of the present invention may be a product (a modified product) obtained by modifying the polyolefin resin with a modifier comprising (A) and one or more selected from (B) chlorine and (C) one or more selected from α,β-unsaturated carboxylic acids and derivatives thereof as needed (a modifier comprising (A) and one or more selected from (B) and (C)).

(B) Chlorine

When the modifier comprises (B) chlorine, a chlorine content in the modified polyolefin resin, which is not limited to a particular content, is preferably 2% by weight or more and more preferably 4% by weight or more. The chlorine content in the modified polyolefin resin is preferably 45% by weight or less and more preferably 25% by weight or less. When the chlorine content in the modified polyolefin resin is 2% by weight or more, adhesion (adhesiveness) to various kinds of low-polarity base materials is favorable, and the stability of a solution of the modified polyolefin resin is favorable. When the chlorine content in the modified polyolefin resin is 45% by weight or less, adhesion (adhesiveness) to various kinds of low-polarity base materials is favorable. In the present specification, the chlorine content means a value measured in conformity with JIS-K7229. The values of the chlorine content in examples are also values measured in conformity with JIS-K7229.

When the polyolefin resin is modified with Component (B), the structure of the modified polyolefin resin can change by the reaction condition of modification and is difficult to identify.

(C) One or more selected from α,β-unsaturated carboxylic acids and derivatives thereof In the present specification, the α,β-unsaturated carboxylic acids mean compounds containing a carboxy group in which an unsaturated bond is formed between the α-position and the β-position of the carboxy group. Examples of derivates of the compounds include mono or diesters, amides, anhydrides, and imides of the compounds. Further specific examples of α,β-unsaturated carboxylic acids and derivatives thereof include fumaric acid, maleic acid, itaconic acid, citraconic acid, aconitic acid, nadic acid, anhydrides thereof, methyl fumarate, ethyl fumarate, propyl fumarate, butyl fumarate, dimethyl fumarate, diethyl fumarate, dipropyl fumarate, dibutyl fumarate, methyl malate, ethyl malate, propyl malate, butyl malate, dimethyl malate, diethyl malate, dipropyl malate, dibutyl malate, maleimide, and N-phenyl maleimide. (C) is preferably an α,β-unsaturated dicarboxylic acid anhydride, more preferably one or more selected from itaconic anhydride and maleic anhydride, and further preferably maleic anhydride.

One of (C) one or more selected from α,β-unsaturated carboxylic acids and derivatives thereof may be used singly, or two or more of them may be used in a mixed manner.

When the modifier comprises (C) one or more selected from α,β-unsaturated carboxylic acids and derivatives thereof, the graft weight of α,β-unsaturated carboxylic acids and derivatives thereof in the modified polyolefin resin is preferably 0.1% by weight or more and more preferably 0.5% by weight or more. The graft weight is preferably 20% by weight or less and more preferably 10% by weight or less.

The graft weight percent of (C) α,β-unsaturated carboxylic acids and derivatives thereof can be determined by acid value titration, alkali titration, or Fourier transform infrared spectroscopy. The graft weight of (C) in the following examples is a value determined by acid value titration.

When the polyolefin resin is modified with Component (C), the structure of the modified polyolefin resin can change by the reaction condition of modification and is difficult to identify.

[Method of Modification]

The method for manufacturing a modified polyolefin resin of the present invention is a method of manufacture comprising modifying a polyolefin resin having a melting point (Tm) measured by a differential scanning calorimeter (DSC) of 60 to 165° C. with a modifier comprising the following (A):

(A) a monomer mixture comprising the following Monomer Group (A-1) and Monomer Group (A-2) with a weight ratio of Monomer Group (A-1) to Monomer Group (A-2) ((A-1)/(A-2)) of 30/70 to 50/50, Monomer Group (A-1): one or more monomers comprising an ethylenically unsaturated bond and a functional group wherein a homopolymer of the one or more monomers has a glass transition temperature (Tg) of 60° C. or more, Monomer Group (A-2): one or more monomers comprising an ethylenically unsaturated bond and a functional group wherein a homopolymer of the one or more monomers has a glass transition temperature (Tg) of 30° C. or less.

Examples and preferred examples of the polyolefin resin, (A) a monomer mixture, Monomer Group (A-1), and Monomer Group (A-2) are similar to those described above.

The modifier may further comprises one or more selected from (B) chlorine and (C) one or more selected from α,β-unsaturated carboxylic acids and derivatives thereof.

(B) chlorine and (C) one or more selected from α,β-unsaturated carboxylic acids and derivatives thereof are similar to those described above.

The following first describes a method for modifying the polyolefin resin with (A) and (C).

[Method for Modifying Polyolefin Resin with (A) and (C)]

Examples of the method for modifying the polyolefin resin with (A) a monomer mixture and (C) one or more selected from α,β-unsaturated carboxylic acids and derivatives thereof as needed include known methods; known methods of graft polymerization can be used, for example.

Before modifying the polyolefin resin by graft polymerizing (A) a monomer mixture to the polyolefin resin, Polymer Group (A-1) and Polymer Group (A-2) are preferably mixed with each other.

Examples of the method for modifying the polyolefin resin with (A) a monomer mixture include a solution method, in which the polyolefin resin and (A) a monomer mixture are dissolved in an organic solvent (e.g., toluene) that dissolves them to the extent that they are reacted under heat, and a radical generator is added thereto and a melt kneading method, in which the polyolefin resin, (A) a monomer mixture, and a radical generator are kneaded with each other using a Bunbury mixer, a kneader, an extruder, or the like.

When a radical generator is used when the polyolefin resin is modified with (A) a monomer mixture, the radical generator is not limited to a particular radical generator and can be selected from known agents as appropriate. Examples of the radical generator include organic peroxide compounds; specific examples thereof include peroxides (e.g., di-t-butylperoxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butylperoxy benzoate, t-butylperoxy isobutyrate, t-butylperoxy-3,5,5-trimethyl hexanoate, t-butylperoxy-2-ethyl hexanoate, t-butylperoxy isopropyl carbonate, and cumyl peroxyoctate) and azobis(nitriles) (e.g., azo isobutyronitrile); organic peroxide compounds are preferred, and peroxides are more preferred. The amount of the radical generator to be added, which is not limited to a particular amount, is preferably 1 to 50% by weight and more preferably 3 to 30% by weight relative to (A) a monomer mixture. When the amount to be added is 3% by weight or more, a graft rate can be made sufficient; when the amount to be added is 30% by weight or less, economy is achieved.

Examples of the method for modifying the polyolefin resin with (C) include the exemplified methods as the method for modifying the polyolefin resin using (A) a monomer mixture; in the exemplified methods, (C) one or more selected from α,β-unsaturated carboxylic acids and derivatives thereof may be used in place of (A) a monomer mixture. Examples and preferred examples of the radical generator are also similar to those exemplified for (A) a monomer mixture.

The amount of the radical generator to be added, which is not limited to a particular amount, is preferably 1 to 50% by weight and more preferably 3 to 30% by weight relative to the weight of (C) one or more selected from α,β-unsaturated carboxylic acids and derivatives thereof (when (C) is a plurality of ones, the combined weight thereof). When the amount to be added is 3% by weight or more, a graft rate can be made sufficient; when the amount to be added is 30% by weight or less, economy is achieved.

The polyolefin resin may be modified in one step with (A) a monomer mixture and (C) one or more selected from α,β-unsaturated carboxylic acids and derivatives thereof. In this case, the amount of the radical generator to be added is preferably 1 to 50% by weight and more preferably 3 to 30% by weight relative to the combined weight of (A) and (C). When the amount to be added is 3% by weight or more, a graft rate can be made sufficient; when the amount to be added is 30% by weight or less, economy is achieved.

When (C) one or more selected from α,β-unsaturated carboxylic acids and derivatives thereof is used as the modification component, modification may be performed with a reaction aid added; examples of the reaction aid include styrene, o-methyl styrene, p-methyl styrene, α-methyl styrene, divinyl benzene, hexadiene, and dicyclopentadiene.

When the polyolefin resin is modified by graft polymerizing (A) a monomer mixture and (C) one or more selected from α,β-unsaturated carboxylic acids and derivatives thereof as needed to the polyolefin resin, each of (A) and (C) may be added to the polyolefin resin collectively or added thereto successively.

There is no fixed order in the modification of the polyolefin resin with (A) a monomer mixture and (C) one or more selected from α,β-unsaturated carboxylic acids and derivatives thereof performed as needed. Graft polymerization with (A) and graft polymerization with (C) may be performed simultaneously to modify the polyolefin resin simultaneously; alternatively, the graft polymerization with (A) and the graft polymerization with (C) may be performed separately to modify the polyolefin resin.

[Method of Modification with (B) Chlorine]

Examples of the method for modifying the polyolefin resin with (B) chlorine include, but are not limited to, a method that dissolves the polyolefin resin in a Solvent such as chloroform and then blows chlorine gas into the dissolved solution while being irradiated with ultraviolet rays or in the presence of the radical generator; the method is preferred. The chlorine content varies depending on differences in factors such as the type of the polyolefin resin, a reaction scale, and a reaction apparatus; the chlorine content can be adjusted by adjusting the blowing amount and time of the chlorine gas while monitoring them, for example. By increasing the blowing amount of the chlorine gas and/or extending the blowing time of the chlorine gas, the chlorine content can be increased, for example.

The modification using (B) chlorine may be performed directly on the polyolefin resin as described above or performed on a modified product of the polyolefin resin (e.g., a modified product of the polyolefin resin modified with (A), with (C), or with (A) and (C) described above). When modification is performed on the modified product of the polyolefin resin using (B) chlorine, in the method of modification with (B) chlorine described above, the modified product of the polyolefin resin may be used in place of the polyolefin resin.

When the modified polyolefin resin of the present invention is one modified with (B) chlorine, the modified polyolefin resin and a stabilizer are preferably caused to coexist in order to inhibit the separation of chlorine. The stabilizer, which is not limited to a particular compound, is preferably an epoxy compound. The epoxy compound, which is not limited to a particular compound, is preferably one that is compatible with the modified polyolefin resin modified with (B) chlorine. Examples of the epoxy compound include epoxy compounds having an epoxy equivalent of about 100 to 500 and containing one or more epoxy groups in one molecule. Further specific examples thereof include the following compounds: epoxidated soybean oil and epoxidated linseed oil obtained by epoxidating natural vegetable oils having a unsaturated group with peracids such as peracetic acid; epoxidated fatty acid esters obtained by epoxidating unsaturated fatty acids such as oleic acid, tall oil fatty acid, and soybean oil fatty acid; epoxidated alicyclic compounds represented by epoxidated tetrahydrophthalate; compounds obtained by condensing bisphenol A or polyhydric alcohols and epichlorohydrin such as bisphenol A glycidyl ether, ethylene glycol glycidyl ether, propylene glycol glycidyl ether, glycerol polyglycidyl ether, and sorbitol polyglycidyl ether; monoepoxidated compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenylpolyethylene oxide glycidyl ether, and the like; metallic soaps such as calcium stearate and lead stearate used as stabilizers for polyvinyl chloride resins; organic metallic compounds such as dibutyltin dilaurate and dibutyl malate; and hydrotalcite compounds. Only one of the stabilizers may be used, or two or more of them may be used in combination.

The order of the modification using (A) a monomer mixture and the modification using (B) chlorine and the modification with (C) one or more selected from α,β-unsaturated carboxylic acids and derivatives thereof, which are performed as needed, is not limited to a particular order. When the polyolefin resin is modified with (A) a monomer mixture and (C) one or more selected from α,β-unsaturated carboxylic acids and derivatives thereof as needed by graft polymerization by the solution method described above, for example, before the polyolefin resin is modified with (A) and (C) as needed, the polyolefin resin may be modified with (B); after the polyolefin resin is modified with (A) and (C) as needed to obtain a modified product of the polyolefin resin (a graft polymerized product of the polyolefin resin), the modified product of the polyolefin resin may be modified with (B) chlorine to obtain the modified polyolefin resin. In the present specification, the wording "the polyolefin resin is modified with the modification component" includes a case in which the polyolefin resin is modified directly with the modification component and a case in which a modified product obtained by modifying the polyolefin resin using another modification component is modified with the modification component.

When the polyolefin resin is modified with (A) a monomer mixture or (C) one or more selected from α,β-unsaturated carboxylic acids and derivatives thereof by graft polymerization by the melt kneading method, the polyolefin resin is preferably modified with (B) chlorine after being modified by the graft polymerization by the melt kneading method.

The method for manufacturing a modified polyolefin resin of the present invention preferably comprises modifying the polyolefin resin with one or more selected from (B) chlorine and (C) one or more selected from α,β-unsaturated carboxylic acids and derivatives and then modifying it with (A) a monomer mixture and more preferably comprises modifying the polyolefin resin with (C) one or more selected from α,β-unsaturated carboxylic acids and derivatives thereof, then modifying it with (B) chlorine, and then modifying it with (A) a monomer mixture.

[Use]

The modified polyolefin resin of the present invention is useful as an intermediate medium for base materials that are low in adhesion (adhesiveness) and have difficulty in the application of paint or the like. The modified polyolefin resin of the present invention is useful also as an adhesive for two polyolefin-based base materials made of polypropylene, polyethylene, or the like poor in adhesion (adhesiveness), for example; it can be used regardless of the base materials being surface-treated with plasma, corona, or the like. The modified polyolefin resin of the present invention is laminated on the surface of a polyolefin-based base material by a hot-melt method, and paint or the like is further applied thereon, whereby the adhesion stability and the like of the paint can be improved. The modified polyolefin resin of the present invention is suitable also for polar base materials made of polyester, polyurethane, polyamide, or the like. In other words, the modified polyolefin resin of the present invention can be used suitably as adhesives, primers, binders for paint, binders for ink, and the like.

[Other Components]

The modified polyolefin resin of the present invention can be used as a resin composition comprising the modified polyolefin resin comprising components other than the modified polyolefin resin. The resin composition of the present invention may comprise a resin obtained by modifying the polyolefin resin with (B) chlorine and a resin obtained by modifying the polyolefin resin with (C) one or more selected from α,β-unsaturated carboxylic acids and derivatives thereof apart from the modified polyolefin resin of the present invention, for example. The modified polyolefin resin of the present invention can be made into forms corresponding to its use such as a solid form such as powder or pellets, a form of an organic solvent-containing resin composition containing an organic solvent, and a form of an aqueous resin composition containing water as it is or with other components contained. The resin composition comprising the modified polyolefin resin may be blended with additives (e.g., antioxidants, photostabilizers, ultraviolet absorbers, pigments, dyes, and inorganic fillers) as needed.

[Organic Solvent-Containing Resin Composition]

When the resin composition comprising the modified polyolefin resin of the present invention is a resin composition comprising an organic solvent (an organic solvent-containing resin composition), examples of the comprised organic solvent include, but are not limited to, aromatic solvents such as toluene and xylene; ester solvents such as ethyl acetate and an butyl acetate; ketone solvents such as methyl ethyl ketone and methyl butyl ketone; and aliphatic and alicyclic hydrocarbon solvents such as cyclohexane, methylcyclohexane, ethylcyclohexane, nonane, and decane. These solvents may be contained in the resin composition singly or as a mixed solvent of two or more. In view of environmental problems, solvents other than aromatic solvents are preferably used as the organic solvent, and more preferably used is a mixed solvent of an alicyclic hydrocarbon solvent and an ester solvent or a ketone solvent. Further, to increase the storage stability of the modified polyolefin resin solution, 1 to 20% by weight of an alcohol (e.g., methanol, ethanol, propanol, isopropanol (2-propanol), and butanol) and a propylene-based glycol ether (e.g., propylene glycol methyl ether, propylene glycol ethyl ether, and propylene glycol t-butyl ether) are preferably added to the solvent singly or in such a manner as to mix two or more.

[Aqueous Resin Composition]

Examples of a method for making the resin composition comprising the modified polyolefin resin of the present invention a resin composition comprising water (an aqueous resin composition) include, but are not limited to, a forced emulsification method, a phase-inversion emulsification method, a D-phase emulsification method, and a gel emulsification method, which are known; any of these methods can manufacture an emulsified aqueous resin composition. The resin composition comprising the modified polyolefin resin of the present invention may contain a surfactant as needed in order to disperse and emulsify the modified polyolefin resin in water. Examples of the surfactant optionally contained in the resin composition include nonionic surfactants and anionic surfactants. Nonionic surfactants are preferred because the water resistance of a coating obtained from the emulsified aqueous resin composition is more favorable.

Examples of nonionic surfactants include polyoxyethylene alkyl ethers, polyoxyethylene polyoxypropylene alkyl ethers, polyoxyethylene derivatives, polyoxyethylene fatty acid esters, polyoxyethylene polyhydric alcohol fatty acid esters, polyoxyethylene polyoxypropylene polyols, sorbitan fatty acid esters, polyoxyethylene hydrogenated castor oil, polyoxyalkylene polycyclic phenyl ethers, polyoxyethylene alkylamines, alkyl alkanolamides, and polyalkylene glycol (meth)acrylates. Preferred are polyoxyethylene alkyl ethers, polyoxyethylene fatty acid esters, polyoxyethylene sorbitan fatty acid esters, polyoxyethylene alkylamines, and the like.

Examples of anionic surfactants include alkyl sulfates, polyoxyethylene alkyl ether sulfates, alkyl benzene sulfonates, α-olefin sulfonates, methyltaurinates, sulfosuccinates, ether sulfonates, ether carbonates, fatty acid salts, naphthalene sulfonic acid formalin condensates, alkyl amine salts, quaternary ammonium salts, alkyl betaines, and alkylamine oxides; preferred are polyoxyethylene alkyl ether sulfates, sulfosuccinates, and the like.

The amount of the surfactant to be added is preferably 0.1 to 30% by weight and more preferably 5 to 20% by weight relative to the modified polyolefin resin composition. When the amount to be added is 30% by weight or less, an emulsifier for forming the aqueous resin composition is not excessive, adhesion and the water resistance of a coating to be obtained are favorable, a plastic effect and bleeding are inhibited when being made into a dry coating, and blocking is inhibited from occurring, which is thus preferred.

The pH of the aqueous resin composition in the present invention is preferably pH 5 or more and more preferably pH 6 or more. The upper limit thereof is preferably pH 10 or less. In pH 5 or more, neutralization is sufficient, and the modified polyolefin resin is sufficiently dispersed in water or resists settlement and separation with the passage of time, making storage stability favorable, which is thus preferred. In pH 10 or less, compatibility with other components is favorable, which is thus preferred. The aqueous resin composition may contain a basic substance as needed. The basic substance can neutralize an acid component in the modified polyolefin resin to disperse it in water. The basic substance is not limited to a particular substance; preferred examples thereof include sodium hydroxide, potassium hydroxide, ammonia, methylamine, propylamine, hexylamine, octylamine, ethanolamine, propanolamine, diethanolamine, N-methyl diethanolamine, dimethylamine, diethylamine, triethylamine, N,N-dimethyl ethanolamine, 2-dimethylamino-2-methyl-1-propanol, 2-amino-2-methyl-1-propanol, and morpholine; more preferred are ammonia, triethylamine, 2-amino-2-methyl-1-propanol, morpholine, and the like. The content of the basic substance in the aqueous resin composition is not limited to a particular content and may be any content corresponding to the amount of the acid component of the modified polyolefin resin, for example; it is contained in an amount giving a pH of the aqueous resin composition of preferably pH 5 or more and more preferably pH 6 to 10. When the modified polyolefin resin obtained by grafting Component (C) (an unsaturated carboxylic acid and derivatives thereof (e.g., unsaturated carboxylic acid anhydrides)) as a polarity imparting agent and a radical polymerizable monomer to the polyolefin resin with a high degree of modification is used, and the resin composition is made into an emulsified product by the self-emulsifiability of the obtained modified polyolefin resin without using any surfactant, the resin composition preferably contains a strong basic substance (e.g., sodium hydroxide or potassium hydroxide) as the basic substance.

In the aqueous resin composition of the present invention, the average particle diameter of the resin emulsified or dispersed in water is adjusted to preferably 300 nm or less and more preferably 200 nm or less. When the average particle diameter is less than 300 nm, the storage stability and the compatibility with other resins of the aqueous resin composition are favorable, and besides, coating properties such as adhesion to the base material, solvent resistance, water resistance, and blocking resistance improve. The particle diameter may be limitlessly small; when the particle diameter is attempted to be made extremely small, the amount of the emulsifier to be added generally increases, and the coating properties such as adhesion to the base material, water resistance, and solvent resistance are likely to tend to degrade. The average particle diameter in the present specification is one obtained by particle size distribution measurement using a light diffusion method. The adjustment of the particle diameter can be performed by the amount of the emulsifier to be added, the type thereof, stirring power when the resin is emulsified in water, or the like.

As to an instrument used when the aqueous resin composition is manufactured, a single stirring instrument such as a stirring vane, a disper, or a homogenizer, a complex stirring instrument combining them, a sand mill, and a multi-screw extruder can be used. However, to make the average particle diameter of the aqueous resin composition 300 nm or less, the method for manufacturing the aqueous resin composition is preferably a phase-inversion emulsification method or methods using a complex stirring instrument, a sand mill, a multi-screw extruder, or the like having a high shear force.

In the present invention, a crosslinking agent may be used for the aqueous resin composition in accordance with its use and object. The crosslinking agent means a compound that reacts with a hydroxy group, a carboxy group, an amino group, and the like that are present in the modified polyolefin resin, the surfactant, the basic substance, and the like to form a crosslinked structure.

As to the crosslinking agent, one that is water-soluble itself may be used, or one that is being dispersed in water by some means may be used. Specific examples of the crosslinking agents include blocked isocyanate compounds, aliphatic and aromatic epoxy compounds, amine compounds, and amino resins. A method for adding the crosslinking agent is not limited to a particular method. The crosslinking agent can be added during a process in which the modified polyolefin resin is dispersed or emulsified in water or after the process, for example.

The aqueous resin composition of the present invention may be blended with aqueous acrylic resins, aqueous urethane resins, lower alcohols, lower ketones, lower esters, antiseptics, leveling agents, antioxidants, photostabilizers, ultraviolet absorbers, dyes, pigments, metallic salts, acids, or the like as needed depending on its use.

EXAMPLE

The following describes the present invention in more detail with reference to examples and comparative examples; the present invention is not limited to these examples.

A polyolefin resin and modified products thereof were manufactured in accordance with the following manufacture examples 1 to 5.

[Manufacture Example 1] Manufacture of Polyolefin Resin

A propylene-based random copolymer (propylene unit content: 96% by weight, ethylene unit content: 4% by weight, melt flow rate (MFR)=2.0 g/min, and melting point (Tm)=125° C.) manufactured with a metallocene catalyst as a polymerization catalyst was supplied to a twin-screw extruder with a barrel temperature set at 350° C. and was subjected to thermal degradation to obtain a propylene-based random copolymer (a polyolefin resin) with a 190° C. melt viscosity of about 1,500 mPa·s.

[Manufacture Example 2] Manufacture of Modified Product of Polyolefin Resin with Maleic Anhydride After sufficiently mixing in advance 100 parts by weight of the propylene-based random copolymer obtained in the manufacture example 1, 4 parts by weight of maleic anhydride, 2 parts by weight of lauryl methacrylate, and 3 parts by weight of dicumyl peroxide, the mixture was supplied to a twin-screw extruder (L/D=34, diameter=40 mm, and a first barrel to an eighth barrel) and were reacted with a dwell time of 5 minutes, a number of revolution of 300 rpm, and a barrel temperature of 120° C. (the first and the second barrels), 180° C. (the third and the fourth barrels), 100° C. (the fifth barrel), and 130° C. (the sixth to the eighth barrels), and unreacted maleic anhydride was removed by pressure reducing treatment in the sixth to eighth barrels to obtain a modified product of the polyolefin resin with maleic anhydride (MA).

[Manufacture Example 3] Manufacture of Modified Product of Polyolefin Resin with Chlorine Into a glass-lined reaction vessel, 500 g of the propylene-based random copolymer obtained in the manufacture example 1 was charged, 5 L of chloroform was added thereto, chlorine gas was blown from the bottom of the reaction vessel while being irradiated with ultraviolet rays under a pressure of 2 kg/cm$^2$ to perform chlorination, and a resin-chloroform mixture was obtained. The chlorine content of the resin in the mixture was 20.5% by weight. Next, chloroform as a solvent was distilled off from the resin-chloroform mixture with an evaporator to prepare a chloroform solution with a solid content of 30% by weight. Epicoat 828 (manufactured by Yuka Shell Epoxy K. K.) as a stabilizer was added to this chloroform solution in an amount of 4% by weight relative to the solid content, and the mixture was supplied to a twin-screw extruder (L/D=34, diameter=40 mm, and a first barrel to a seventh barrel) and was solidified with a dwell time of 10 minutes, a number of revolution of 50 rpm, and a barrel temperature of 90° C. (the first to the sixth barrels) and 70° C. (the seventh barrel). Pressure reducing treatment was performed in the first and the fourth to the sixth barrels to obtain a modified product of the polyolefin resin with chlorine (Cl).

[Manufacture Example 4] Manufacture of Modified Product of Polyolefin Resin with Maleic Anhydride and Chlorine After sufficiently mixing in advance 100 parts by weight of the propylene-based random copolymer obtained in the manufacture example 1, 4 parts by weight of maleic anhydride, and 3 parts by weight of dicumyl peroxide, the mixture was supplied to a twin-screw extruder (L/D=34, diameter=40 mm, and a first barrel to an eighth barrel) and were reacted with a dwell time of 5 minutes, a number of revolution of 300 rpm, and a barrel temperature of 120° C. (the first and the second barrels), 180° C. (the third and the fourth barrels), 100° C. (the fifth barrel), and 130° C. (the sixth to the eighth barrels), and unreacted maleic anhydride was removed by pressure reducing treatment in the sixth to eighth barrels to obtain a propylene-based random copolymer modified with maleic anhydride. Into a glass-lined reaction vessel with a volume of 50 L, 2 kg of this copolymer was charged, 20 L of chloroform was added thereto, chlorine gas was blown from the bottom of the reaction vessel while being irradiated with ultraviolet rays under a pressure of 2 kg/cm² to perform chlorination, and a resin-chloroform mixture was obtained. The chlorine content of the resin in the mixture was 21.6% by weight. Next, chloroform as a solvent was distilled off from the resin-chloroform mixture with an evaporator to prepare a chloroform solution with a solid content of 30% by weight. A stabilizer (t-butylphenyl glycidyl ether) was added to this chloroform solution in an amount of 1.5% by weight relative to the solid content, and the mixture was supplied to a twin-screw extruder (L/D=34, diameter=40 mm, and a first barrel to a seventh barrel) and was solidified with a dwell time of 10 minutes, a number of revolution of 50 rpm, and a barrel temperature of 90° C. (the first to the sixth barrels) and 70° C. (the seventh barrel). Pressure reducing treatment was performed in the first and the fourth to the sixth barrels to obtain a solid modified product of the polyolefin resin with maleic anhydride and chlorine.

[Manufacture Example 5] Manufacture of Polyolefin Resin

Isotactic polypropylene (IPP) (melting point (Tm)=150° C.) manufactured with a Ziegler Natta catalyst as a polymerization catalyst was supplied to a twin-screw extruder with a barrel temperature set at 350° C. and was subjected to thermal degradation to obtain IPP (a polyolefin resin) with a 190° C. melt viscosity of about 2,000 mPa·s. Next, in the exactly same manner as the manufacture example 4 except that the obtained IPP was used in place of the propylene-based random copolymer (the polyolefin resin) obtained in the manufacture example 1, obtained was a solid modified product of the polyolefin resin with maleic anhydride and chlorine with a chlorine content of 24.0% by weight.

Table 2 lists the chlorine content, the graft amount of maleic anhydride, the weight average molecular weight, the number average molecular weight, and the degree of dispersion of the polyolefin resin and the modified products obtained in the manufacture examples 1 to 5.

TABLE 2

| | Polyolefin resin or modified products of Manufacture Examples 1 to 5 | | | | |
|---|---|---|---|---|---|
| | Manufacture Example 1 | Manufacture Example 2 | Manufacture Example 3 | Manufacture Example 4 | Manufacture Example 5 |
| Chlorine content (relative to solid content) | — | — | 20.5% by weight | 21.6% by weight | 24.0% by weight |
| Graft amount of maleic anhydride (relative to solid content) | — | 3.8% by weight | — | 3.8% by weight | 3.6% by weight |
| Weight average molecular weight (Mw) | 51,000 | 55,000 | 65,000 | 60,000 | 60,000 |
| Number average molecular weight (Mn) | 26,800 | 29,000 | 33,000 | 30,700 | 27,300 |
| Degree of dispersion (Mw/Mn) | 1.90 | 1.90 | 1.97 | 1.95 | 2.20 |

Example 1

Into a flask equipped with a stirrer, a thermometer, and a cooling pipe for refluxing monomers, 25 g of the propylene-based random copolymer obtained in the manufacture example 1 as a polyolefin resin and 100 g of toluene were charged, and the mixture was heated up to a temperature of 85° C. Next, 5 g of benzoyl peroxide was charged thereinto, and the mixture was stirred for 30 minutes, then 100 g of Mixture A as a monomer mixture having the composition ratio listed in Table 3-1 (3 g of methacrylic acid, 20 g of methyl methacrylate, 17 g of cyclohexyl methacrylate, 3 g of 2-hydroxyethyl acrylate, 24 g of 2-methoxyethyl acrylate, and 33 g of butyl methacrylate) was added thereto for about 3 hours, and further a graft copolymerization reaction was carried out for 7 hours to obtain a modified polyolefin resin as a uniform, transparent toluene solution (non-volatile content: 40% by weight). Next, a flexibility test and an adhesion test were carried out on the obtained modified polyolefin resin by the methods shown below. Table 4-1 lists the results.

<Preparation of Coating Test Piece>

After kneading 100 g of the modified polyolefin resin solution (solid content: 40% by weight) obtained in the example 1 and 20 g of titanium dioxide with a sand mill for 3 hours, xylene was added so as to give 13 to 15 sec/20° C. with a No. 4 Ford cup to adjust the viscosity of the obtained kneaded object. For a base material, an ultra-high-rigidity polypropylene (PP) plate (TX-933A manufactured by Mitsubishi Chemical Corporation) was used. The kneaded object subjected to viscosity adjustment was applied to the base material with an air spray gun and was dried at 80° C. for 30 minutes to obtain Coating Test Piece 1 with a film thickness of a modified polyolefin resin layer of 10 μm. Next, two-part curing urethane paint (product name: Retan PG80 531 manufactured by Kansai Paint Co., Ltd.) was applied to Coating Test Piece 1 with an air spray gun, was dried at 80° C. for 30 minutes, and was left at room temperature for 24 hours, whereby a urethane resin layer (an overcoated layer) (film thickness: 30 μm) was formed on the modified polyolefin resin layer (a pretreatment layer or a primer layer) to prepare Coating Test Piece 2.

<Flexibility (Flex Resistance) Test>

In conformity with JIS K5600-5-1, Coating Test Piece 1 was set in a bending testing apparatus having a cylindrical mandrel, and the flexibility of the coating at room temperature was visually evaluated.
The following shows criteria:
G: Good, there is no cracking in the coating.
NG: Not good, there is cracking in the coating.

<Adhesion Test>

Notches reaching the base material were formed at intervals of 1 mm in the coating of Coating Test Piece 2 obtained above to divide the coating into 100 square sections. A piece of cellophane adhesive tape was brought into intimate contact therewith and was peeled off from the intimate contact surface in a 180° direction, and the degree of remaining of the coating was determined. The peeling of the coating includes the peeling of the coating from the base material (peeling at the interface between the base material and the modified polyolefin resin layer) and the peeling of the coating from the modified polyolefin resin layer (peeling at the interface between the modified polyolefin resin layer and the urethane resin layer); on which interface the peeling has occurred can be visually determined by difference in reflected light or the like. The following shows criteria:
B: Best, no peeling is observed in the coating.
G: Good, there is practically no problem, although peeling is observed in some degree at edges of some sections of the coating.
NG1: Slightly bad, peeling is observed at the interface between the primer layer (the modified polyolefin resin layer) and the overcoated layer (the urethane resin layer).
NG2: Bad, peeling from the base material is observed.

Examples 2 to 30 and Comparative Examples 1 to 15

Operations similar to those of the example 1 were performed using polyolefin resins or modified products listed in Table 4-1 and Table 4-2 as polyolefin resins or modified products and using monomer mixtures listed in Table 4-1 and Table 4-2 as monomer mixtures to obtain modified polyolefin resins of examples 2 to 30 and comparative examples 1 to 15 as toluene solutions (non-volatile content: 40% by weight). For each of the obtained modified polyolefin resins, a flexibility test and an adhesion test were carried out in a manner similar to the example 1. Table 4-1 and Table 4-2 list the results. In Table 4-1 and Table 4-2, "Cl" means that they are modified with chlorine, whereas "MA" means that they are modified with maleic anhydride.

Table 3-1, Table 3-2, and Table 3-3 list the compositions of Mixtures A to I used in examples 1 to 30 and comparative examples 1 to 15. In Table 3-1 to Table 3-3, the unit of Homopolymer Tg and Total Tg is "Celsius degree." The composition ratio of the monomers contained in each of the mixtures is a weight ratio.

TABLE 3-1

Monomer compositions of Mixtures A to C

| | Monomer | | Functional group | Homopolymer Tg | Mixture A | Mixture B | Mixture C |
|---|---|---|---|---|---|---|---|
| A-1 | Acrylic acid | AA | Carboxy group | 103 | | | |
| | Methacrylic acid | MAA | Carboxy group | 228 | 3 | 3 | 3 |
| | Methyl methacrylate | MMA | Ester group | 105 | 20 | 15 | 15 |
| | Ethyl methacrylate | EMA | Ester group | 65 | | | |
| | Isopropyl methacrylate | IPMA | Ester group | 81 | | | |
| | t-Butyl methacrylate | t-BMA | Ester group | 107 | | | |
| | Cyclohexyl methacrylate | CHMA | Ester group | 83 | 17 | 14 | 30 |
| | Isobornyl methacrylate | IBMA | Ester group | 155 | | | |
| A-2 | Hydroxyethyl acrylate | HEA | Ester group | Hydroxy group | −15 | 3 | |
| | Hydroxypropyl acrylate | HPA | Ester group | Hydroxy group | −7 | | 3 |
| | Hydroxybutyl acrylate | HBA | Ester group | Hydroxy group | −32 | | | 3 |
| | 2-methoxyethyl acrylate | MEA | Ester group | Ether group | −50 | 24 | |
| | 2-methoxyethyl methacrylate | MEMA | Ester group | Ether group | −2 | | 35 |
| | 3-methoxybutyl acrylate | MBA | Ester group | Ether group | −56 | | |
| | Tetrahydrofurfuryl acrylate | THFA | Ester group | Ether group | −12 | | | 20 |
| | Butyl methacrylate | BMA | Ester group | | 20 | 33 | 30 | 29 |

TABLE 3-1-continued

Monomer compositions of Mixtures A to C

| | Monomer | | Functional group | Homo-polymer Tg | Mixture A | Mixture B | Mixture C |
|---|---|---|---|---|---|---|---|
| | Lauryl methacrylate | LMA | Ester group | −65 | | | |
| | n-Butyl acrylate | BA | Ester group | −54 | | | |
| | | | (A-1)/(A-2) | | 40/60 | 32/68 | 48/52 |
| | | | Total Tg | | 22.4 | 15.3 | 29.8 |

TABLE 3-2

Monomer compositions of Mixtures D to F

| | Monomer | | Functional group | | Homo-polymer Tg | Mixture D | Mixture E | Mixture F |
|---|---|---|---|---|---|---|---|---|
| A-1 | Acrylic acid | AA | Carboxy group | | 103 | | | |
| | Methacrylic acid | MAA | Carboxy group | | 228 | 3 | 3 | 3 |
| | Methyl methacrylate | MMA | Ester group | | 105 | | | |
| | Ethyl methacrylate | EMA | Ester group | | 65 | | | |
| | Isopropyl methacrylate | IPMA | Ester group | | 81 | | | |
| | t-Butyl methacrylate | t-BMA | Ester group | | 107 | 20 | 15 | 30 |
| | Cyclohexyl methacrylate | CHMA | Ester group | | 83 | 17 | 14 | 15 |
| | Isobornyl methacrylate | IBMA | Ester group | | 155 | | | |
| A-2 | Hydroxyethyl acrylate | HEA | Ester group | Hydroxy group | −15 | 3 | | |
| | Hydroxypropyl acrylate | HPA | Ester group | Hydroxy group | −7 | | 3 | |
| | Hydroxybutyl acrylate | HBA | Ester group | Hydroxy group | −32 | | | 3 |
| | 2-methoxyethyl acrylate | MEA | Ester group | Ether group | −50 | | | |
| | 2-methoxyethyl methacrylate | MEMA | Ester group | Ether group | −2 | | | 29 |
| | 3-methoxybutyl acrylate | MBA | Ester group | Ether group | −56 | 24 | | |
| | Tetrahydrofurfuryl acrylate | THFA | Ester group | Ether group | −12 | | 30 | |
| | Butyl methacrylate | BMA | Ester group | | 20 | | | |
| | Lauryl methacrylate | LMA | Ester group | | −65 | 33 | 35 | 20 |
| | n-Butyl acrylate | BA | Ester group | | −54 | | | |
| | | | (A-1)/(A-2) | | | 40/60 | 32/68 | 48/52 |
| | | | Total Tg | | | −14.8 | −9.3 | 18.8 |

TABLE 3-3

Monomer compositions of Mixtures G to I

| | Monomer | | Functional group | Homo-polymer Tg | Mixture G | Mixture H | Mixture I |
|---|---|---|---|---|---|---|---|
| A-1 | Acrylic acid | AA | Carboxy group | 103 | 3 | 3 | |
| | Methacrylic acid | MAA | Carboxy group | 228 | | | |
| | Methyl methacrylate | MMA | Ester group | 105 | | 7 | |
| | Ethyl methacrylate | EMA | Ester group | 65 | 30 | | |
| | Isopropyl methacrylate | IPMA | Ester group | 81 | 27 | | |
| | t-Butyl methacrylate | t-BMA | Ester group | 107 | | | |
| | Cyclohexyl methacrylate | CHMA | Ester group | 83 | | | |
| | Isobornyl methacrylate | IBMA | Ester group | 155 | | 10 | |
| A-2 | Hydroxyethyl acrylate | HEA | Ester group / Hydroxy group | −15 | 3 | 3 | |
| | Hydroxypropyl acrylate | HPA | Ester group / Hydroxy group | −7 | | | |
| | Hydroxybutyl acrylate | HBA | Ester group / Hydroxy group | −32 | | | |
| | 2-methoxyethyl acrylate | MEA | Ester group / Ether group | −50 | 20 | 30 | |
| | 2-methoxyethyl methacrylate | MEMA | Ester group / Ether group | −2 | | | |
| | 3-methoxybutyl acrylate | MBA | Ester group / Ether group | −56 | | | |
| | Tetrahydrofurfuryl acrylate | THFA | Ester group / Ether group | −12 | | | |
| | Butyl methacrylate | BMA | Ester group | 20 | 17 | 17 | 100 |
| | Lauryl methacrylate | LMA | Ester group | −65 | | | |
| | n-Butyl acrylate | BA | Ester group | −54 | | 30 | |
| | (A-1)/(A-2) | | | | 60/40 | 20/80 | 0/100 |
| | Total Tg | | | | 27.9 | −17.3 | 20 |

TABLE 4-1

Evaluation results of examples

| | Polyolefin resin or modified product | | | | |
|---|---|---|---|---|---|
| | Modification raw material of modified product | Monomer mixture | | | |
| | (B) | (C) | (A-1/A-2) | Flexibility | Adhesion |
| Ex. 1 | Manufacture Ex. 1 | — | — | Mixture A | G | G |
| Ex. 2 | Manufacture Ex. 1 | — | — | Mixture B | G | G |
| Ex. 3 | Manufacture Ex. 1 | — | — | Mixture C | G | G |
| Ex. 4 | Manufacture Ex. 1 | — | — | Mixture D | G | G |
| Ex. 5 | Manufacture Ex. 1 | — | — | Mixture E | G | G |
| Ex. 6 | Manufacture Ex. 1 | — | — | Mixture F | G | G |
| Ex. 7 | Manufacture Ex. 2 | — | MA | Mixture A | G | G |
| Ex. 8 | Manufacture Ex. 2 | — | MA | Mixture B | G | G |
| Ex. 9 | Manufacture Ex. 2 | — | MA | Mixture C | G | G |
| Ex. 10 | Manufacture Ex. 2 | — | MA | Mixture D | G | G |
| Ex. 11 | Manufacture Ex. 2 | — | MA | Mixture E | G | G |
| Ex. 12 | Manufacture Ex. 2 | — | MA | Mixture F | G | G |
| Ex. 13 | Manufacture Ex. 3 | Cl | — | Mixture A | G | G |
| Ex. 14 | Manufacture Ex. 3 | Cl | — | Mixture B | G | G |
| Ex. 15 | Manufacture Ex. 3 | Cl | — | Mixture C | G | G |
| Ex. 16 | Manufacture Ex. 3 | Cl | — | Mixture D | G | G |
| Ex. 17 | Manufacture Ex. 3 | Cl | — | Mixture E | G | G |
| Ex. 18 | Manufacture Ex. 3 | Cl | — | Mixture F | G | G |
| Ex. 19 | Manufacture Ex. 4 | Cl | MA | Mixture A | G | B |

TABLE 4-1-continued

Evaluation results of examples

| | Polyolefin resin or modified product | | | | | |
|---|---|---|---|---|---|---|
| | Modification raw material of modified product | (B) | (C) | Monomer mixture (A-1/A-2) | Flexibility | Adhesion |
| Ex. 20 | Manufacture Ex. 4 | Cl | MA | Mixture B | G | G |
| Ex. 21 | Manufacture Ex. 4 | Cl | MA | Mixture C | G | G |
| Ex. 22 | Manufacture Ex. 4 | Cl | MA | Mixture D | G | G |
| Ex. 23 | Manufacture Ex. 4 | Cl | MA | Mixture E | G | G |
| Ex. 24 | Manufacture Ex. 4 | Cl | MA | Mixture F | G | G |
| Ex. 25 | Manufacture Ex. 5 | Cl | MA | Mixture A | G | B |
| Ex. 26 | Manufacture Ex. 5 | Cl | MA | Mixture B | G | G |
| Ex. 27 | Manufacture Ex. 5 | Cl | MA | Mixture C | G | G |
| Ex. 28 | Manufacture Ex. 5 | Cl | MA | Mixture D | G | G |
| Ex. 29 | Manufacture Ex. 5 | Cl | MA | Mixture E | G | G |
| Ex. 30 | Manufacture Ex. 5 | Cl | MA | Mixture F | G | G |

TABLE 4-2

Evaluation results of comparative examples

| | Polyolefin resin or modified product | | | | | |
|---|---|---|---|---|---|---|
| | Modification raw material of modified product | (B) | (C) | Monomer mixture (A-1/A-2) | Flexibility | Adhesion |
| Comparative Ex. 1 | Manufacture Ex. 1 | — | — | Mixture G | G | NG2 |
| Comparative Ex. 2 | Manufacture Ex. 1 | — | — | Mixture H | G | NG2 |
| Comparative Ex. 3 | Manufacture Ex. 1 | — | — | Mixture I | G | NG2 |
| Comparative Ex. 4 | Manufacture Ex. 2 | — | MA | Mixture G | G | NG2 |
| Comparative Ex. 5 | Manufacture Ex. 2 | — | MA | Mixture H | G | NG2 |
| Comparative Ex. 6 | Manufacture Ex. 2 | — | MA | Mixture I | G | NG2 |
| Comparative Ex. 7 | Manufacture Ex. 3 | Cl | — | Mixture G | G | NG2 |
| Comparative Ex. 8 | Manufacture Ex. 3 | Cl | — | Mixture H | G | NG2 |
| Comparative Ex. 9 | Manufacture Ex. 3 | Cl | — | Mixture I | G | NG2 |
| Comparative Ex. 10 | Manufacture Ex. 4 | Cl | MA | Mixture G | G | NG2 |
| Comparative Ex. 11 | Manufacture Ex. 4 | Cl | MA | Mixture H | G | NG2 |
| Comparative Ex. 12 | Manufacture Ex. 4 | Cl | MA | Mixture I | G | NG2 |
| Comparative Ex. 13 | Manufacture Ex. 5 | Cl | MA | Mixture G | G | NG2 |
| Comparative Ex. 14 | Manufacture Ex. 5 | Cl | MA | Mixture H | G | NG2 |
| Comparative Ex. 15 | Manufacture Ex. 5 | Cl | MA | Mixture I | G | NG2 |

The following is clear from the results listed in Table 4-1 and Table 4-2.

The modified polyolefin resins of examples 1 to 30 can form the coating that is excellent in flexibility and is excellent in adhesion to the base material and adhesion to the overcoated layer on the base material (polypropylene).

In contrast, the modified polyolefin resins of comparative examples 1 to 15, in which Mixture I, in which Monomer (A-1) is not contained in the monomer mixture, is used and Mixture G or Mixture H, in which the weight ratio of Monomer (A-1) to Monomer (A-2) ((A-1)/(A-2)) is out of the range of 30/70 to 50/50, is used, are not bad in flexibility, but are poor in adhesion, and thus do not satisfy both flexibility and adhesion.

It is revealed from the foregoing results that the modified polyolefin resin of the present invention can form a coating having flexibility (bendability) to, not only a polar base material, even a low-polarity base material (a nonpolar base material), especially a poorly adherable polyolefin-based base material with no surface treatment and has excellent adhesion even when being dried at low temperatures. It is also revealed that the modified polyolefin resin of the present invention is excellent as a pretreatment agent such as a primer.

<Examples of Aqueous Resin Composition>

Example 31

To a four-neck flask equipped with a stirrer, a cooling pipe, a thermometer, and a dropping funnel, 100 parts by weight of the propylene-based random copolymer obtained in the manufacture example 1 and 10 parts by weight of a polyoxyethylene alkyl ether as a surfactant were added and were kneaded at 120° C. for 30 minutes. Next, 10 parts by weight of 2-amino-2-methyl-1-propanol was added thereto for 5 minutes, and the mixture was maintained for 5 minutes, and 300 parts by weight of ion exchanged water at 90° C. was added thereto for 40 minutes. Subsequently, the mixture was cooled to room temperature while stirring it to obtain a modified polyolefin resin as an aqueous resin composition. The solid content of the aqueous resin composition containing the modified polyolefin resin was 30% by weight, the pH thereof was 9.0, and the average particle diameter thereof was 280 nm. Next, Coating Test Piece 1 and Coating Test Piece 2 were prepared in a manner similar to the operations described in the example 1 except that the aqueous resin composition containing the modified polyolefin resin was used in place of the modified polyolefin resin solution obtained in the example 1, and a flexibility test and an adhesion test were carried out thereon. Table 5-1 lists the results.

Examples 32 to 60 and Comparative Examples 16 to 30

Operations similar to those of the example 31 were performed using polyolefin resins or modified products listed in Table 5-1 and Table 5-2 as polyolefin resins or modified products and using monomer mixtures listed in Table 5-1 and Table 5-2 as monomer mixtures to obtain modified polyolefin resins of examples 32 to 60 and comparative examples 16 to 30 as aqueous resin compositions (non-volatile content: 30% by weight). Coating Test Piece 1 and Coating Test Piece 2 were prepared in a manner similar to the operations of the example 31 using the aqueous resin compositions containing the respective modified polyolefin resins, and a flexibility test and an adhesion test were carried out thereon. Table 5-1 and Table 5-2 list the results. In Table 5-1 and Table 5-2, "Cl" represents that the resins are modified with chlorine, whereas "MA" represents that the resins are modified with maleic anhydride.

TABLE 5-1

Evaluation results of examples

| | Polyolefin resin or modified product | | | | |
|---|---|---|---|---|---|
| | | Modification raw material of modified product | | Monomer mixture | |
| | | (B) | (C) | (A-1/A-2) | Flexibility | Adhesion |
| Ex. 31 | Manufacture Ex. 1 | — | — | Mixture A | G | G |
| Ex. 32 | Manufacture Ex. 1 | — | — | Mixture B | G | G |
| Ex. 33 | Manufacture Ex. 1 | — | — | Mixture C | G | G |
| Ex. 34 | Manufacture Ex. 1 | — | — | Mixture D | G | G |
| Ex. 35 | Manufacture Ex. 1 | — | — | Mixture E | G | G |
| Ex. 36 | Manufacture Ex. 1 | — | — | Mixture F | G | G |
| Ex. 37 | Manufacture Ex. 2 | — | MA | Mixture A | G | G |
| Ex. 38 | Manufacture Ex. 2 | — | MA | Mixture B | G | G |
| Ex. 39 | Manufacture Ex. 2 | — | MA | Mixture C | G | G |
| Ex. 40 | Manufacture Ex. 2 | — | MA | Mixture D | G | G |
| Ex. 41 | Manufacture Ex. 2 | — | MA | Mixture E | G | G |
| Ex. 42 | Manufacture Ex. 2 | — | MA | Mixture F | G | G |
| Ex. 43 | Manufacture Ex. 3 | Cl | — | Mixture A | G | G |
| Ex. 44 | Manufacture Ex. 3 | Cl | — | Mixture B | G | G |
| Ex. 45 | Manufacture Ex. 3 | Cl | — | Mixture C | G | G |
| Ex. 46 | Manufacture Ex. 3 | Cl | — | Mixture D | G | G |
| Ex. 47 | Manufacture Ex. 3 | Cl | — | Mixture E | G | G |
| Ex. 48 | Manufacture Ex. 3 | Cl | — | Mixture F | G | G |
| Ex. 49 | Manufacture Ex. 4 | Cl | MA | Mixture A | G | B |
| Ex. 50 | Manufacture Ex. 4 | Cl | MA | Mixture B | G | G |
| Ex. 51 | Manufacture Ex. 4 | Cl | MA | Mixture C | G | G |
| Ex. 52 | Manufacture Ex. 4 | Cl | MA | Mixture D | G | G |
| Ex. 53 | Manufacture Ex. 4 | Cl | MA | Mixture E | G | G |
| Ex. 54 | Manufacture Ex. 4 | Cl | MA | Mixture F | G | G |
| Ex. 55 | Manufacture Ex. 5 | Cl | MA | Mixture A | G | B |

TABLE 5-1-continued

Evaluation results of examples

| | Polyolefin resin or modified product | | | | |
|---|---|---|---|---|---|
| | Modification raw material of modified product | | Monomer mixture | | |
| | | (B) | (C) | (A-1/A-2) | Flexibility | Adhesion |
| Ex. 56 | Manufacture Ex. 5 | Cl | MA | Mixture B | G | G |
| Ex. 57 | Manufacture Ex. 5 | Cl | MA | Mixture C | G | G |
| Ex. 58 | Manufacture Ex. 5 | Cl | MA | Mixture D | G | G |
| Ex. 59 | Manufacture Ex. 5 | Cl | MA | Mixture E | G | G |
| Ex. 60 | Manufacture Ex. 5 | Cl | MA | Mixture F | G | G |

TABLE 5-2

Evaluation results of comparative examples

| | Polyolefin resin or modified product | | | | | |
|---|---|---|---|---|---|---|
| | Modification raw material of modified product | | | Monomer mixture | Flexi-bility | Ad-hesion |
| | | (B) | (C) | (A-1/A-2) | | |
| Comparative Ex. 16 | Manufacture Ex. 1 | — | — | Mixture G | G | NG2 |
| Comparative Ex. 17 | Manufacture Ex. 1 | — | — | Mixture H | G | NG2 |
| Comparative Ex. 18 | Manufacture Ex. 1 | — | — | Mixture I | G | NG2 |
| Comparative Ex. 19 | Manufacture Ex. 2 | — | MA | Mixture G | G | NG2 |
| Comparative Ex. 20 | Manufacture Ex. 2 | — | MA | Mixture H | G | NG2 |
| Comparative Ex. 21 | Manufacture Ex. 2 | — | MA | Mixture I | G | NG2 |
| Comparative Ex. 22 | Manufacture Ex. 3 | Cl | — | Mixture G | G | NG2 |
| Comparative Ex. 23 | Manufacture Ex. 3 | Cl | — | Mixture H | G | NG2 |
| Comparative Ex. 24 | Manufacture Ex. 3 | Cl | — | Mixture I | G | NG2 |
| Comparative Ex. 25 | Manufacture Ex. 4 | Cl | MA | Mixture G | G | NG2 |
| Comparative Ex. 26 | Manufacture Ex. 4 | Cl | MA | Mixture H | G | NG2 |
| Comparative Ex. 27 | Manufacture Ex. 4 | Cl | MA | Mixture I | G | NG2 |
| Comparative Ex. 28 | Manufacture Ex. 5 | Cl | MA | Mixture G | G | NG2 |
| Comparative Ex. 29 | Manufacture Ex. 5 | Cl | MA | Mixture H | G | NG2 |
| Comparative Ex. 30 | Manufacture Ex. 5 | Cl | MA | Mixture I | G | NG2 |

From the results listed in Table 5-1 and Table 5-2, the modified polyolefin resins of the examples 31 to 60 can form the coating that is excellent in flexibility and is excellent in adhesion to the base material and adhesion to the overcoated layer on the base material (polypropylene). The modified polyolefin resins of Comparative examples 16 to 30, in which Mixture I, Mixture G, or Mixture H is used, are not bad in flexibility, but are poor in adhesion, and thus do not satisfy both flexibility and adhesion.

It is revealed from the foregoing results that, even when being made into the aqueous resin composition, the modified polyolefin resin of the present invention can form a coating having flexibility (bendability) to, not only a polar base material, even a low-polarity base material (a nonpolar base material), especially a poorly adherable polyolefin-based base material with no surface treatment and has excellent adhesion even when being dried at low temperatures. It is also revealed that, even when being made into the aqueous resin composition, the modified polyolefin resin of the present invention is excellent as a pretreatment agent (e.g., a primer).

The invention claimed is:

1. A modified polyolefin resin, obtained by a process comprising:
    modifying a polyolefin resin having a melting point (Tm) measured by a differential scanning calorimeter (DSC) of 60 to 165° C. with a modifier,
    wherein the modifier comprises:
    (A) a monomer mixture comprising Monomer Group (A-1) and Monomer Group (A-2) with a weight ratio of Monomer Group (A-1) to Monomer Group (A-2) ((A-1)/(A-2)) of 30/70 to 50/50, and (B) chlorine:
        Monomer Group (A-1): two or more monomers comprising an ethylenically unsaturated bond and a functional group wherein when a homopolymer is made from each monomer of said two or more monomers said homopolymer has a glass transition temperature (Tg) of 60° C. or more, and
        Monomer Group (A-2): two or more monomers comprising an ethylenically unsaturated bond and a functional group wherein when a homopolymer is made from each monomer of said two or more monomers said homopolymer has a glass transition temperature (Tg) of 30° C. or less.

2. The modified polyolefin resin according to claim 1, wherein the functional group of the Monomer Group (A-1), the functional group of the Monomer Group (A-2), or both, is one or more selected from the group consisting of a carboxy group, a group represented by —(C=O)—O—, a hydroxy group, an ether group, and an optionally substituted amino group.

3. The modified polyolefin resin according to claim 1, wherein at least one of the one or more monomers included in Monomer Group (A-1) comprises a carboxyl group as the functional group.

4. The modified polyolefin resin according to claim 1, wherein Monomer Group (A-1) includes one or more selected from the group consisting of a (meth)acrylic acid and an alkyl (meth)acrylate.

5. The modified polyolefin resin according to claim 1, wherein at least one of the one or more monomers included in Monomer Group (A-2) comprises one or more selected from the group consisting of a hydroxy group and an ether group as the functional group.

6. The modified polyolefin resin according to claim 1, wherein Monomer Group (A-2) includes one or more selected from the group consisting of an alkyl (meth)acrylate, a hydroxyalkyl (meth)acrylate, and an alkoxy alkyl (meth)acrylate.

7. The modified polyolefin resin according to claim 1, wherein the modifier further comprises:
(C) one or more selected from the group consisting of an α,β-unsaturated carboxylic acid and a derivative thereof.

8. A resin composition, comprising the modified polyolefin resin according to claim 1.

9. An organic solvent-containing resin composition, comprising:
the modified polyolefin resin according to claim 1; and
an organic solvent.

10. An aqueous resin composition, comprising:
the modified polyolefin resin according to claim 1; and
water.

11. A method for manufacturing a modified polyolefin resin, the method comprising:
modifying a polyolefin resin having a melting point (Tm) measured by a differential scanning calorimeter (DSC) of 60 to 165° C. with a modifier comprising:
(A) a monomer mixture comprising Monomer Group (A-1) and Monomer Group (A-2) with a weight ratio of Monomer Group (A-1) to Monomer Group (A-2) ((A-1)/(A-2)) of 30/70 to 50/50, and (B) chlorine:
Monomer Group (A-1): two or more monomers comprising an ethylenically unsaturated bond and a functional group wherein when a homopolymer is made from each monomer of said two or more monomers said homopolymer has a glass transition temperature (Tg) of 60° C. or more, and
Monomer Group (A-2): two or more monomers comprising an ethylenically unsaturated bond and a functional group wherein when a homopolymer is made from each monomer of said two or more monomers said homopolymer has a glass transition temperature (Tg) of 30° C. or less.

12. The method according to claim 11, wherein the modifier further comprises: (C) one or more selected from the group consisting of an α,β-unsaturated carboxylic acid and a derivative thereof.

13. The method according to claim 12, comprising modifying the polyolefin resin with the one or more selected from group consisting of (B) and (C) and then with (A).

* * * * *